United States Patent [19]

Hergart

[11] 4,277,442
[45] Jul. 7, 1981

[54] CATALYTIC EXHAUST CLEANER

[75] Inventor: P. Anders Hergart, Malmö, Sweden

[73] Assignee: Unikat AB, Malmo, Sweden

[21] Appl. No.: 95,588

[22] Filed: Nov. 16, 1979

Related U.S. Application Data

[63] Continuation of Ser. No. 758,437, Jan. 11, 1977, abandoned.

[51] Int. Cl.³ ............................ F01N 3/10; F01N 3/28; B01D 53/34; B01J 8/02
[52] U.S. Cl. ..................................... 422/119; 60/299; 60/300; 422/174; 422/177
[58] Field of Search ............... 422/168, 174, 177, 119; 60/299, 300; 248/215

[56] References Cited

U.S. PATENT DOCUMENTS

| | | | |
|---|---|---|---|
| 3,441,381 | 4/1969 | Keith et al. | 422/176 |
| 3,443,911 | 5/1969 | Keith et al. | 422/177 |
| 3,607,131 | 9/1971 | Williams et al. | 422/206 |
| 3,963,087 | 6/1976 | Grosseau | 60/299 X |
| 3,967,929 | 7/1976 | Tamazawa et al. | 422/177 |
| 4,083,694 | 4/1978 | Takeda et al. | 60/299 X |

Primary Examiner—Michael S. Marcus
Attorney, Agent, or Firm—Berman, Aisenberg & Platt

[57] ABSTRACT

An exhaust cleaner containing a catalyst material and intended for temporary use on a motor car is arranged as a portable or transportable unit. It is provided with means for suspension on the car and with means for passing the exhaust gas from the exhaust pipe of the car through the catalyst material. The catalyst material has a large heat capacity and there are provided means for electrically preheating the catalyst material.

3 Claims, 7 Drawing Figures

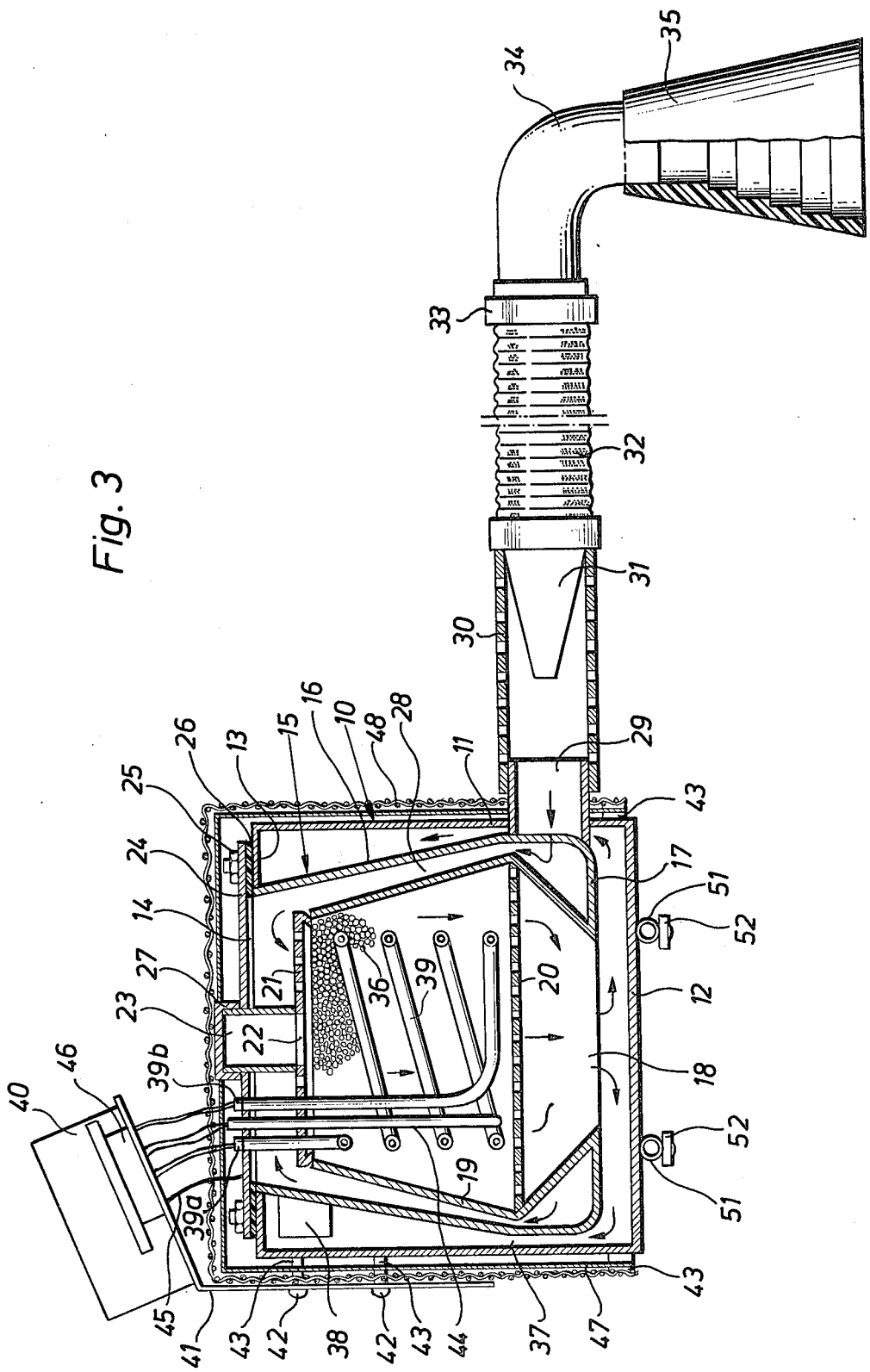

CATALYTIC EXHAUST CLEANER

This is a continuation of application Ser. No. 758,437, filed Jan. 11, 9177, now abandoned.

The invention relates to a catalytic exhaust cleaner intended for temporary use on motor cars when they are moved under their own power in factories, workshops, garages, etc., for burning fuel residues, carbon monoxide and other combustible products in the exhaust gas in order to comply with hygienic requirements.

As long as a motor car is on the production line in a motor car factory it is carried from one station to another by means of special drive and conveyor arrangements. However, when it arrives at the end of the production line, the stage has been reached where the internal combustion engine of the car has to be started and run to make certain that it is operative and to make any necessary adjustments. When adjustment is required, the car is transferred from the production line to one or more stations for correction of defects and deficiencies. If the engine is operative, as it is in most cases, the car is driven by its own power from the production line to the first station and then between the stations. Even when the exhaust system of the car contains built-in exhaust cleaning equipment, starting the car provides heavy emission of air contaminants, especially carbon monoxide, due to the fact that the exhaust cleaner generally is not effective below a predetermined increased operating temperature which does not exist when first starting the engine and is not reached during the short running period of the engine when driving the car from the production line or during following adjustment and/or driving.

Also in car workshops, garages, depots, etc., exhaust problems are associated with driving cars in and out of related premises or from one place to another within the premises where stationary exhaust extraction equipment does not have enough range to be fully effective.

Therefore, it is necessary to take care of the exhaust gases in car factories, workshops, garages, depots, etc., in one way or other in order to eliminate the health hazard and the bad working environment created where motor cars are run under their own power indoors.

For this purpose an exhaust hose is sometimes connected to the end opening of the exhaust pipe of the engine as, for instance, in vehicle workshops and vehicle test plants, but this method for directly extracting exhaust gas cannot often be adopted due to the fact that the route of the car within the premises is not a straight path but extends irregularly in all directions. Therefore, it is customary to provide a powerful evacuation at different locations in order to take care of the exhaust gas. This, however, is not an economical solution of the air pollution problem referred to. The investment, the operating cost and the heat losses of such local evacuation of the air from the premises imply considerable increase in heating and/or air conditioning costs. Moreover, such local ventilation produces a heavy draught in the premises which means that the elimination of one inconvenience introduces another. So far it has not been possible to solve the related pollution problem in a satisfactory and economical way.

It is a primary object of this invention to provide as a complement to any stationary suction equipment for exhaust extraction a new and improved catalytic exhaust cleaner for temporary use on a motor car for considerably reducing the contaminants discharged by a running internal combustion engine, individually on each car in a manner which is very economical as far as investment and operating costs are concerned.

It is a further object of this invention to provide a new and improved catalytic exhaust cleaner (made operative immediately on starting an engine by stationary preheating of the catalyst material) for temporary use on a motor car in order to overcome exhaust problems connected with starting and temporarily running a car engine.

A still further object of this invention is to provide a new and improved catalytic exhaust cleaner which does not affect the operation of a motor car engine, for temporary use on the car.

Yet another object of this invention is to provide a new and improved catalytic exhaust cleaner for temporary use on motor cars for solving exhaust problems in workshops, garages, depots, etc., without using stationary suction devices or as a complement to such devices in order to solve ventilation problems and eliminate health hazards.

Additional objects and advantages of the invention are set forth in part in the description which follows and in part are obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the invention provides an exhaust cleaner for temporary use on a motor car. This cleaner comprises a container, a granulated catalyst material (having good heat accumulating capacity), contained in said contained, a protective screen mounted on the outside of the contained, means on the container for temporarily suspending the exhaust cleaner on a suitable part of a motor car, means for temporarily connecting the interior of the container to the end opening of the exhaust pipe of the car, electric heating means in said container for heating the catalyst material contained therein, and means for connecting said electric heating means to an external power supply.

The exhaust cleaner is preferably provided with means for indicating the temperature of the catalyst material contained in the container.

An air inlet is also preferably provided to supply secondary air to the interior of the container by ejector action of the exhaust gas supplied to the exhaust cleaner.

The accompanying drawings, which are incorporated in and constitute a part of this specification, illustrate embodiments of the invention and, together with the description, serve to explain the principles of the invention.

In the drawings:

FIG. 3 is a vertical cross sectional view of the exhaust cleaner shown in FIGS. 1 and 2;

Reference will now be made in detail to the present preferred embodiments of the invention, examples of which are illustrated in the accompanying drawings.

Figure 1:
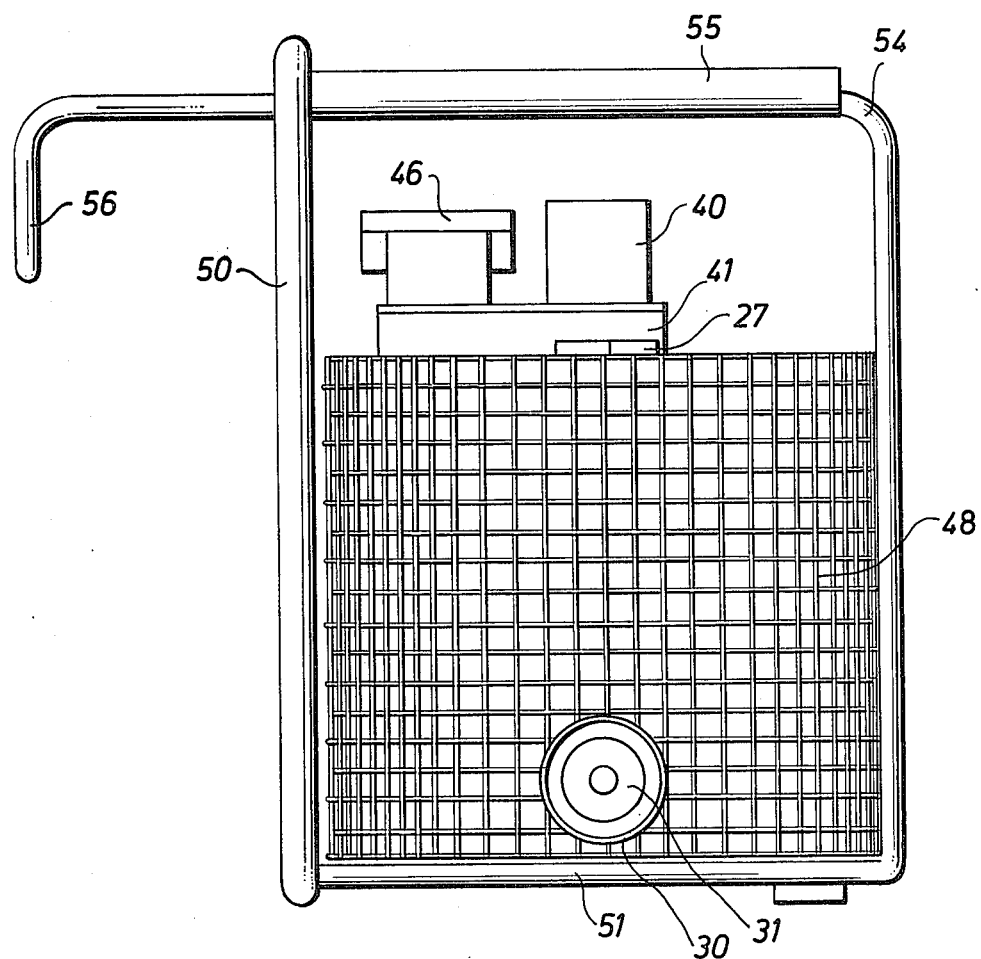
FIG. 1 is a side view of an exhaust cleaner according to the teachings of the invention.
Figure 2:
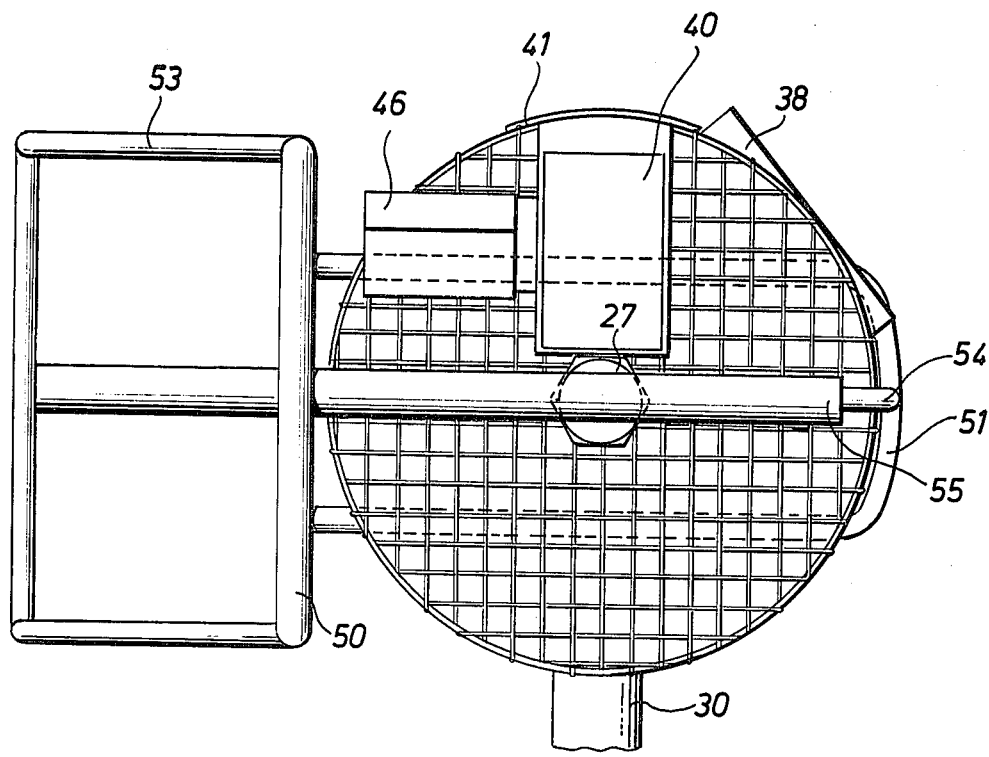
FIG. 2 is a top plan view of the exhaust cleaner.

The exhaust cleaner disclosed in FIGS. 1 to 3 in the drawings comprises an outer metal sheet casing 10 having a cylindrical side wall 11, a bottom wall 12 and an annular top wall 13 forming a circular central opening 14.

In casing 10 there is provided a double-walled metal sheet container 15 having an outer side wall 16 forming an upper truncated portion which is joined to annular top wall 13 at the edge of opening 14 as by welding, and a lower cylindrical portion which joins the outer periphery of an annular bottom wall 17 which forms a circular bottom opening 18 of container 15. The container also comprises an inner side wall 19 forming an upper truncated portion and a lower truncated portion the major ends of which are joined together. A perforated bottom wall 20 extends transversely through the space defined by the inner side wall 19 at the level where the two truncated portions thereof are joined together. At the lower end the inner side wall 19 is joined to annular bottom wall 17 at the edge of opening 18, and at the upper end there is provided a perforated top wall 21 having a central opening 22. A socket pipe 23 is joined to top wall 21 at opening 22 and extends through a lid 24 to which said pipe is connected as by welding a short length of the pipe projecting from lid 24 at the upper side thereof. Thus, top wall 21 and lid 24 form an integral unit which is connected to casing 10 by screws and nuts 25 an annular packing 26 being provided between the lid and wall 13. In the mounted position of said unit the perforated top wall 21 sealingly engages the upper edge of side wall 19. A closure cap 27 is screwed onto pipe 23.

As will be seen from FIG. 3 walls 16 and 19 are spaced and thus there is provided between said walls an annular passage 28. A pipe 29 communicates with said passage and is extended from casing 10. A perforated pipe 30 is connected at one end to pipe 29, a Venturi nozzle 31 being connected to the other end of pipe 30 and opens in said pipe. Said other end of pipe 30 is connected to a flexible hose 32 at one end thereof, and at the other end of the hose there is connected by a hose clip 33 a bow 34 having a rubber adapter 35 for connection of bow 34 to exhaust pipes of different diameters.

The space defined by inner wall 19 and perforated end walls 20 and 21 is filled with a granulated catalyst material, such as KCE 1912K or KCE 3366K/MU, obtained from Kali-Chemie Engelhard, Hannover, Federal Republic of Germany. This granulated catalyst material can be filled into said space through socket pipe 23, and it is maintained in the space brtween perforated walls 20 and 21, allowing free passage of gas through the catalyst material. As will be seen from FIG. 3, the catalyst space communicates with passage 28 through top wall 21 and with opening 18 through bottom wall 20. At opening 18 the catalyst space communicates with a passage 37 formed between casing 10 and container 15, said passage communicating with the surroundings through an outlet 38 provided on side wall 11 of casing 10 (FIG. 2).

In the catalyst space formed by container 15 there is arranged an electric heating element 39 which is helically wound and is embedded in catalyst material 36. The ends of heating element 39 are extended through perforated wall 21 and through lid 24 at 39a and 39b and are connected to a connector 40 mounted on a bracket 41 which is mounted to casing 10 by screws 42, ceramic heat insulators 43 being arranged between casing 10 and bracket 41.

A rod type thermocouple 44 is inserted into the catalyst material 36 through lid 24 and top wall 21 in order to sense the temperature of the catalyst material. The thermocouple too is connected to connector 40, to which is also connected a wire 45 from lid 24 as a ground connection. Connector 40 is of the six pole type.

To thermocouple 44 is connected a microammeter 46 of plug-in type for indicating the temperature sensed by thermocouple 44.

On the outside of casing 10 there are mounted by screws a number of ceramic heat insulators 43, the heads of the screws being countersunk in said insulators. These insulators support a protective mica wall 47 surrounding side wall 11 as well as top wall 13 and lid 24. A metal wire netting 48 is arranged externally of the protective mica wall 47 and is connected to casing 10 by means of screws 42', the rest is supported by the ceramic insulators 43 so as to be held at a distance from wall 47, as will be seen from FIG. 3.

For handling and mounting the described cleaner there is provided on casing 10 a metal rod cage comprising an upstanding rectangular frame 50 and a bottom frame 51 connected to frame 50 as by welding at the lower end thereof and extending transversely thereto under bottom 12 of casing 10. Bottom 12 of the casing is connected to frame 51 by screw studs and nuts 52. At the upper end of frame 50 there is provided a hook-like connecting loop 53 projecting from frame 50 at the side thereof which is opposite to casing 10, and a handle 54, provided with a heat insulating cover 55, is connected with loop 53 and frame 50 and is screwed to side wall 11 of casing 10. It is also connected with bottom frame 51.

The exhaust cleaner described above with reference to FIGS. 1 to 3 is a portable unit weighing about 20 pounds, which can easily be handled manually and carried by handle 54 from one place to another. It is intended for temporary use on a motor car, as initially described, for cleaning exhaust gas from the car at cold start and low rate running when the exhaust gas contains particularly high amounts of fuel residues, carbon monoxide and other combustible products, where cars have to be moved under their own power or the engines have to be temporarily run while adjustments are made as is necessary in workshops, garages, depots, etc.

Figure 4:
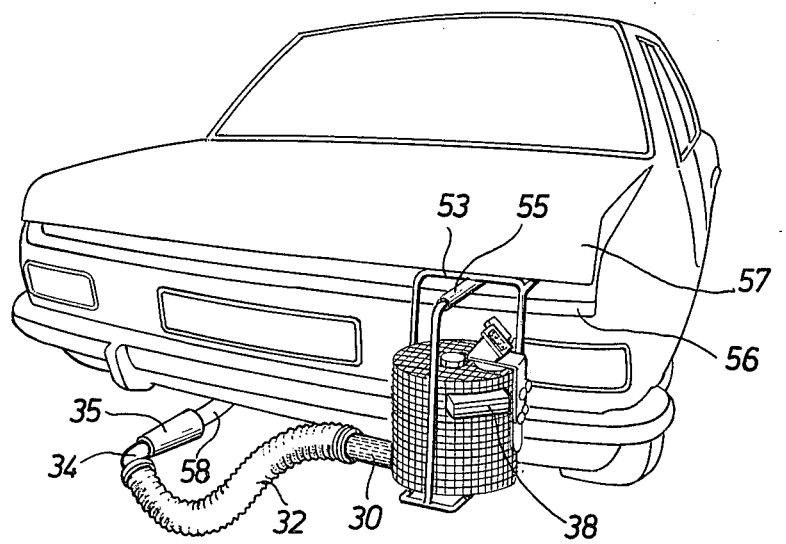
FIG. 4 is a perspective view of a motor car as seen from the rear end thereof with an exhaust cleaner according to the teachings of the invention temporarily attached to the car and connected to the exhaust pipe thereof.

FIG. 4 illustrates as an example the exhaust cleaner attached to a motor car. As is shown in FIG. 4 the exhaust cleaner is suspended from the upper edge 56 of the trunk of the car by connecting loop 53 being hooked onto said edge the lid 57 of the trunk being left partly opened. The exhaust cleaner can be attached to the car in other ways. For example, it can be suspended from the trunk lid handle where such handle is provided, or from the rear bumper of the car. The flexible hose 32 is connected to the exhaust pipe 58 of the car by means of adapter 35, and thus it will be seen that the exhaust gas discharged from the engine of the car through pipe 58 is passed through hose 32 to the exhaust cleaner. However, in order to be effective the exhaust cleaner must be conditioned, that is the granulated catalyst material 36 must be heated to a predetermined temperature at which it is effective for catalytically burning fuel residues, carbon monoxide and other combustible products present in the exhaust gas. The electric heating element 39 is provided for preheating the granulated catalyst material 36 and such preheating must be made before the exhaust cleaner is put in use on a motor car if the catalyst material is not already at the predetermined temperature as indicated by instrument 46. The preheating can be accomplished by connecting connector 40 to a suitable power supply by a cable but preferably the heating is made in a specific stand of the type illustrated in FIG. 5.

Figure 5:
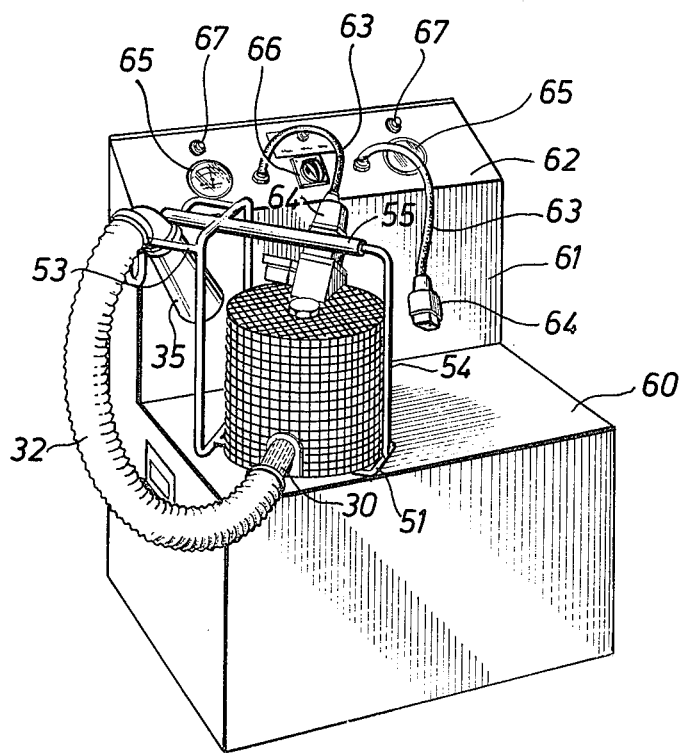
FIG. 5 is a perspective view of a loading stand with an exhaust cleaner according to the teachings of the invention placed therein and having the electric heating element thereof connected to the power supply.

In FIG. 5 there is shown a stand comprising a supporting table 60 on which two exhaust cleaners may be placed. This table can of course be arranged to support a single exhaust cleaner or a plurality of exhaust cleaners. At the rear side of the table and projecting from the table there is arranged a console 61 having a sloping top panel 62 which forms a switchboard. It is assumed that the loading stand is connected to the usual AC mains. For the connection of each exhaust cleaner there is provided on switchboard 62 a connecting cable 63 having a connecting plug 64 which fits into connector 40 on the exhaust cleaner. By means of connecting cable 63 there is also connected to thermocouple 44 an instrument 65 indicating the temperature of the granulated catalyst material 36. By means of a switch 66 the power supply can be switched on and, off and moreover, there may be arranged in the loading stand a timer for automatically controlled preheating of the exhaust cleaner such that the cleaner is preheated for a predetermined time period. There may also be provided in the stand a temperature sensitive switch controlled by the temperature as sensed by thermocouple 44 in order to switch off the heating of the exhaust cleaner when the catalyst material 36 has reached a predetermined temperature. An indicator lamp 67 indicates when preheating is taking place.

It is the intention that one or more exhaust cleaners of the type described shall be stored in one or more stands as disclosed in FIG. 5 so that they can be preheated to a predetermined temperature and be kept at that temperature and thus be ready for use on a motor car in the manner illustrated in FIG. 4. Instrument 65 indicates when the exhaust cleaner is ready for use and the same indication is also obtained by means of instrument 46 on the exhaust cleaner so that it is possible to check the condition of the exhaust cleaner also when it is disconnected from the stand.

The stand may be a stationary unit as illustrated in FIG. 5 or it may be arranged as a carriage which can be moved to different places in a workshop, a factory, etc.

When the car is started, the exhaust gas from the engine thereof will be passed through hose 32 to pipe 29, fresh air being sucked into said pipe through the perforation of the perforated pipe 30 by ejector action obtained by means of Venturi nozzle 31. The gas passes into space 28 of the double walled container 15—the gas flow is indicated by arrows in FIG. 3—to the upper end of the container and when the gas passes through this space it contacts the inner wall 19 of the container which defines the space containing the heated catalyst material 36. This wall is warm due to the heating of the catalyst material and thus the gas will be heated when passing to the top of container 15. The gas then passes through the perforated top wall 21 into the preheated catalyst material 36 and, when passing through said material, unhealthy products, such as fuel residues, carbon monoxide and other combustible products, contained in the exhaust gas (when leaving the engine, especially when this is cold started or is running at a low temperature) will be burnt by the catalytic action obtained by means of the catalyst material. Such products will be present in the exhaust gas also when the car has permanent exhaust cleaning equipment or other means for obtaining substantially complete combustion of the exhaust gases because such equipment or other means usually is not fully effective until the catalyst thereof has reached a predetermined operative temperature which may take some time after the engine has been started from a cool condition.

The gas passes through perforated wall 20 and opening 18 into passage 37 formed between the outer wall 16 of container 15 and casing 10 and is discharged from the casing through outlet 38. It will be noted that the cross sectional area of container 15 diminishes from wall 20 to opening 18, the area of opening 18 substantially corresponding to the total area of the perforations of wall 20. In this connection it should be noted that the edges at opening 18 should be smoothly curved in order to avoid turbulence of the gas when passing from the container to the casing. The gas discharged from outlet 38 is substantially free from toxic constituents thanks to the fact that the catalyst material 36 already from the start of the engine is fully operative due to the preheating thereof.

The gas passing through passage 37 is warm and consequently will heat the outer wall 16 of container 15. Thus, the gas passing into space 28 will be heated not only by wall 19 but also by wall 16.

It will be noted that the width of passage 28 increases in the direction of gas flow in order to compensate for the reduction of the diameter of the container and the increasing volume of the gas being heated.

In order that the catalyst material 36 shall maintain the operativeness thereof, i.e. in order that such material shall maintain the temperature required for the catalytic action thereof, the catalyst material should have a high heat capacity. The two catalyst materials mentioned above have this property. The temperature of the catalyst material will decrease when the exhaust gas passes through the material but if the heat capacity of the material is high such temperature decrease will be delayed. Moreover, a certain amount of heat will be developed in the catalyst material due to the catalytic burning of exhaust gas constituents therein. Thus, the catalyst material will maintain the temperature although the exhaust cleaner is used intermittently for an extended period.

The catalyst of type KCE 1912K mentioned above is suitable for cleaning exhaust gas obtained from gasoline containing lead but can be used also for cleaning exhaust gas from compression-ignition engines. However, for such engines it is preferred to use the other catalyst material of type KCE 3366K/MU. This catalyst material is also preferred for cleaning exhaust gas obtained from engines operating on lead free gasoline and LPG.

Since compression-ignition engines (Diesel engines) operate with excess of air it is not necessary to arrange for supply of secondary air by means of perforated pipe 30 and nozzle 31 as shown and described above when the exhaust cleaner is to be used for that type of internal combustion engines only. However, such supply of secondary air should be arranged in case the exhaust cleaner is to be used for internal combustion engines operating on gasoline or LPG.

Figure 7:
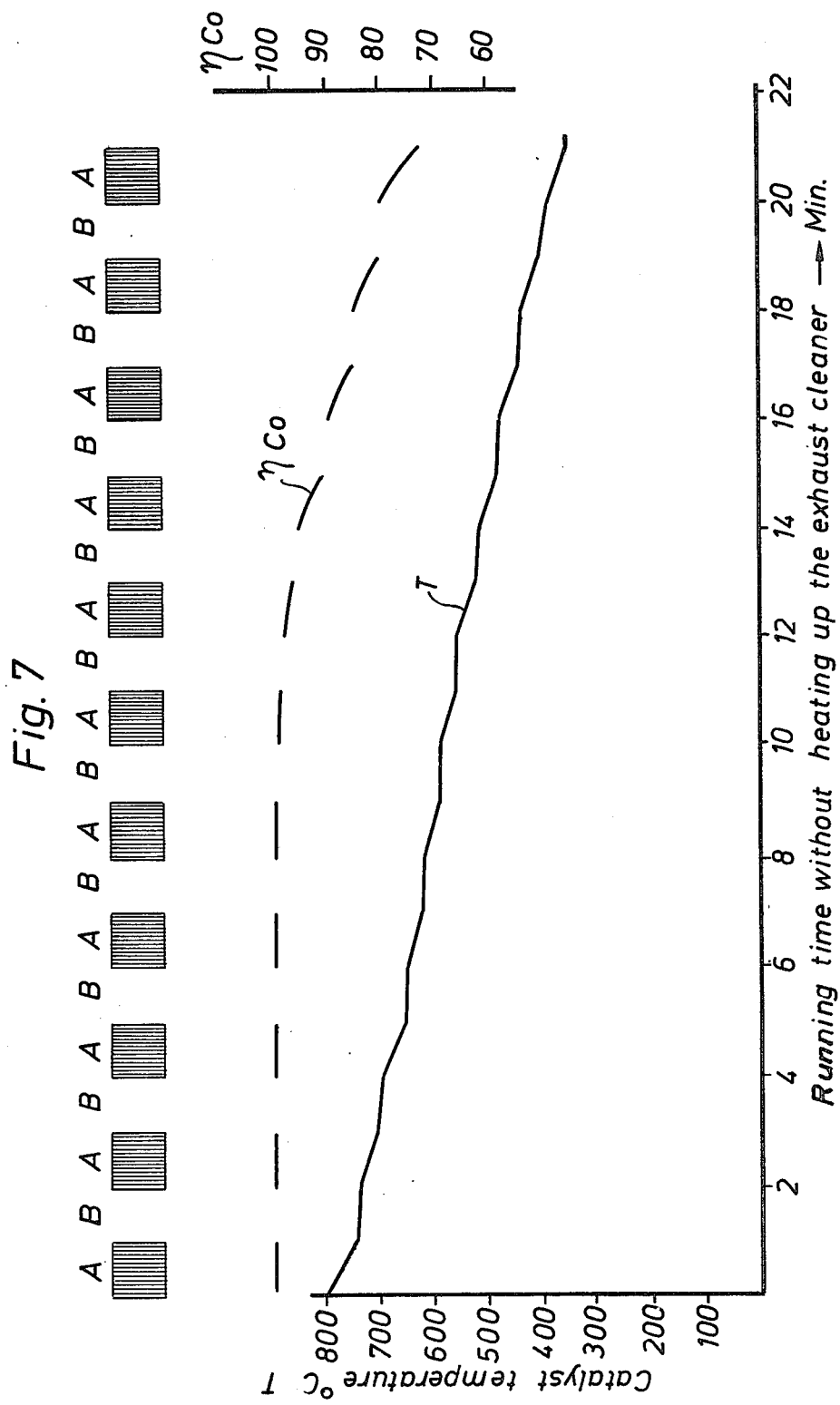
FIG. 7 is a diagram illustrating the cleaning effect obtained by the exhaust cleaner according to the teachings of the invention.

The diagram in FIG. 7 illustrates how the CO-conversion $\eta_{CO}$ in an exhaust cleaner as described above varies as a function of temperature of catalyst material 36 and running time. The diagram is based on measurements made on a motor car engine of the type Volvo B20A, having four cylinders and a cylinder volume of 2 liters, which was started and run at low speed at intervals of one minute, indicated A, spaced by intervals, indicated B, also of one minute during which the engine was inoperative. The catalyst material had initially a temperature of about 800° C. obtained by electric pre-heating in the manner described, and at that temperature the CO-conversion is very close to 100%. It will be seen that the CO-conversion has decreased to a value which is lower than 80% after twenty minutes, and this means that the exhaust cleaner is fully effective under the related conditions when used for more than a quarter of an hour without intervening preheating.

A motor car of type Ford 17M 2000 having a V6 engine and a cylinder volume of 2 liters was cold started without using the exhaust cleaner described and the contents of carbon monoxide and hydrocarbon were measured. Then, the same measurements were made with the exhaust cleaner connected to the exhaust pipe as disclosed in FIG. 4. The results of these measurements are shown in TABLE I below.

TABLE I

| | CO | CH |
|---|---|---|
| After start without exhaust cleaner | 7 volume % | 300 ppm |
| After start with exhaust cleaner | 0.1 volume % | 15 ppm |
| Conversion | $\eta_{CO}$=98.6% | $\eta_{CH}$ = 95% |

Although the exhaust cleaner has a temperature of the catalyst material 36 which is about 800° C. it is possible to carry the exhaust cleaner at the handle without any risk for injuries because casing 10 is well protected against contact by mica sheet 47 and wire netting 48. Other protective arrangements can of course be provided in order to avoid accidents due to contact with heated portions of the exhaust cleaner.

Figure 6:
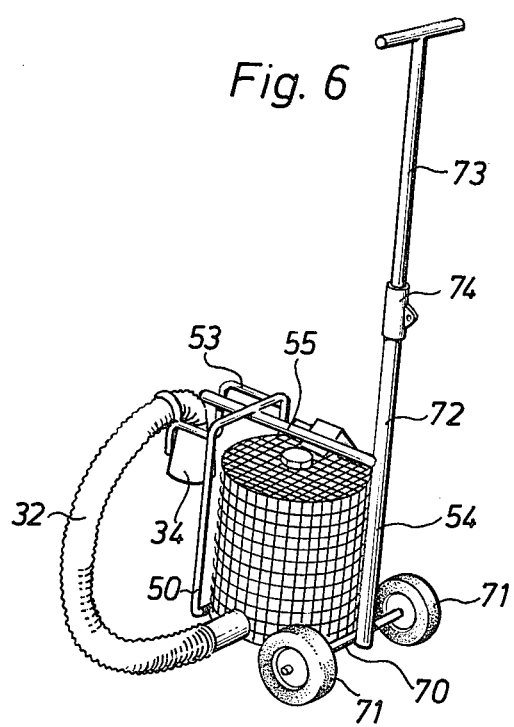
FIG. 6 is a perspective view of an exhaust cleaner according to the teachings of the invention of a transportable type.

In FIG. 6 there is disclosed another embodiment of the exhaust cleaner according to the invention. In this embodiment there is provided a shaft 70 which may be fixed to frame 51 and on which are rotatably mounted two wheels 71. Handle 54 has an upward extension 72, and there is connected to the extension a handle 73 at a connection 74 by means of which handle 73 may be fixed in the position shown in FIG. 6, and which allows handle 73 to be folded to a position in which it extends downwardly from connection 74 along extension 72. Thus, the exhaust cleaner can be moved on the floor as a carriage to the place where it is to be used. When it has been attached to the car, handle 73 can be folded down in order not to interfere with operations that are performed on the car.

Summarizing, the exhaust cleaner according to the invention thus provides temporary effective exhaust gas cleaning on a motor car during an initial period of the operation of the engine such as at cold start, according to the same principles which are utilized in a permanent automotive exhaust cleaning system having a catalyst bed. The exhaust cleaner according to the invention has been developed for use in car factories, in garages, in warehouses and other premises where it is required to move motor cars under power or the engines thereof are temporarily run while adjustments are made. It will be seen that the invention provides a flexible and economical solution of the exhaust problems where stationary suction devices are missing or where such stationary suction devices cannot be arranged for economic or other reasons in order to take care of toxic exhaust gas discharged from running internal combustion engines. The exhaust cleaner according to the invention can easily be conditioned to be operative immediately on starting the engine and it is well suited for temporary attachment to a motor car and can easily be handled as a portable and/or transportable unit.

Generally, the exhaust cleaner according to the invention can be used where temporary effective exhaust gas cleaning must be obtained in case an exhaust gas cleaning system is not provided on the car or such system, when provided, is not given enough time to reach an operative condition.

It will be apparent to those skilled in the art that various modifications and variations in addition to those mentioned above could be made in the exhaust cleaner of the invention without departing from the scope and spirit of the invention.

I claim:

1. An exhaust cleaner for temporary use on a motor-car having an exhaust pipe, comprising:
   (a) a container having an exhaust gas inlet and an exhaust gas outlet;
   (b) a catalyst material having good heat accumulating capacity disposed within the interior of said container;
   (c) electrical heating means disposed in said container in direct contact with said catalyst material;
   (d) means for sensing and indicating the temperature of said catalyst material;
   (e) a protective enclosure at least partially surrounding said container and insulatedly spaced therefrom comprising a shield of heat insulating material and a metallic shield arranged externally of said heat insulating material;
   (f) frame means mounting said container for ready transportation comprising an upstanding substantially vertical frame and a bottom frame attached to said upstanding frame and extending substantially transversely thereto, a hook-like projection extending from said frame for temporarily attaching said exhaust cleaner to a motorcar in proximity to its exhaust pipe and a handle connected to said frame for manually transporting said exhaust cleaner;
   (g) a flexible hose connected to said exhaust inlet at one end and having means at the other end thereof for temporary connection to the outlet end of an exhaust pipe; and
   (h) means electrically connected to said heating coil for connecting the heating coil to a power supply external to a motorcar in order to pre-heat said catalyst material to a predetermined temperature, prior to attaching said exhaust cleaner to a motor-car.

2. The exhaust cleaner set forth in claim 1 wherein said container is defined by a plurality of walls, two of said walls being perforated and said gas inlet communicating with one of said perforated walls and said gas outlet communicating with the other of said perforated walls, for passing exhaust gas through the interior of said container.

3. The exhaust cleaner set forth in claim 1 wherein said electrical heating means comprises an electrical coil and said catalyst material is a granulated catalyst, said coil being embedded therein.

* * * * *